(12) United States Patent
Wohler et al.

(10) Patent No.: US 10,264,436 B1
(45) Date of Patent: Apr. 16, 2019

(54) BLE NETWORKING SYSTEMS AND METHODS PROVIDING CENTRAL AND PERIPHERAL ROLE REVERSAL WITH INDEPENDENT PERIPHERAL NETWORK CONNECTIVITY

(71) Applicant: Link Labs, Inc., Annapolis, MD (US)

(72) Inventors: Scott Wohler, Halethorpe, MD (US); Mark Bloechl, Elkridge, MD (US); Ricardo Luna, Jr., Las Cruces, NM (US); Patrick Li, Potomac, MD (US); Brian Emery Ray, Annapolis, MD (US)

(73) Assignee: LINK LABS, INC., Annapolis, MD (US)

( * ) Notice: Subject to any disclaimer, the term of this patent is extended or adjusted under 35 U.S.C. 154(b) by 0 days.

(21) Appl. No.: 15/991,249

(22) Filed: May 29, 2018

(51) Int. Cl.
  *H04W 4/80* (2018.01)
  *H04W 4/02* (2018.01)
  *H04W 8/26* (2009.01)
  *G01S 19/42* (2010.01)
  *H04L 29/08* (2006.01)

(52) U.S. Cl.
  CPC ............ *H04W 4/80* (2018.02); *G01S 19/42* (2013.01); *H04L 67/125* (2013.01); *H04W 4/025* (2013.01); *H04W 8/26* (2013.01)

(58) Field of Classification Search
  CPC ......... H04W 4/80; H04W 4/025; H04W 8/26; G01S 19/42; H04L 67/125
  USPC ...................................................... 370/331
  See application file for complete search history.

(56) References Cited

U.S. PATENT DOCUMENTS

| | | | |
|---|---|---|---|
| 5,920,287 | A | 7/1999 | Belcher |
| 6,469,628 | B1 | 10/2002 | Richards |
| 7,141,715 | B2 | 11/2006 | Shapira |
| 7,242,294 | B2 | 7/2007 | Warrior |
| 7,411,921 | B2 | 8/2008 | Strong |
| 7,518,500 | B2 | 4/2009 | Aninye |
| 7,973,655 | B2 | 7/2011 | Blinnikka |

(Continued)

FOREIGN PATENT DOCUMENTS

WO WO 2016/053909 A1 4/2016

OTHER PUBLICATIONS

Bluetooth Core Specification v 5.0, Dec. 2016, pp. 252-256.

*Primary Examiner* — Chi Tang P Cheng
(74) *Attorney, Agent, or Firm* — Charles B. Lobsenz; Brian H. Buck; Potomac Law Group, PLLC

(57) ABSTRACT

Provided are systems and methods for reversing the conventional roles of central and peripheral devices in a BLE network. Doing so includes implementing an end node (EN) to be operable with a cellular backhaul and as the receiver of messaging generated by components within the network for the downstream cellular transfer of proximity and other types of information collected by the EN. The EN is configured to collect GPS and WiFi positional information determinative of a location of the EN, and transmit such positional information directly from the EN over an available backhaul so as to enable a determination of a relative location thereof based only on that positional information. In these ways, location and other types of information associated with the EN may become known with increased reliability and certainty in the face of obstacles such as structural barriers and distance that ordinarily limit BLE performance.

24 Claims, 9 Drawing Sheets

(56) References Cited

U.S. PATENT DOCUMENTS

| | | |
|---|---|---|
| 8,026,814 B1 | 9/2011 | Heinze |
| 8,368,555 B2 | 2/2013 | Gilbert |
| 8,712,330 B2 | 4/2014 | Desai |
| 8,831,627 B2 | 9/2014 | Aninye |
| 8,849,926 B2 | 9/2014 | Marzencki |
| 9,328,857 B2 | 5/2016 | Conte |
| 9,374,667 B1 | 6/2016 | Jorgensen et al. |
| 9,426,616 B1 | 8/2016 | Rasband |
| 9,439,041 B2 | 9/2016 | Parvizi |
| 9,788,167 B2 | 10/2017 | Geng et al. |
| 9,992,633 B2 | 6/2018 | Geng et al. |
| 2005/0113132 A1 | 5/2005 | Irsheid |
| 2005/0250519 A1 | 11/2005 | Samuel |
| 2007/0001813 A1 | 1/2007 | Maguire |
| 2007/0004426 A1 | 1/2007 | Pfleging |
| 2007/0046459 A1 | 3/2007 | Silverman |
| 2009/0092049 A1 | 4/2009 | Hargrave |
| 2010/0131567 A1 | 5/2010 | Dorogusker |
| 2012/0311149 A1 | 12/2012 | Trevino |
| 2013/0060351 A1 | 3/2013 | Imming |
| 2013/0065603 A1 | 3/2013 | Hovav |
| 2013/0314210 A1 | 11/2013 | Schoner |
| 2013/0317944 A1 | 11/2013 | Huang |
| 2014/0149004 A1 | 5/2014 | Best |
| 2015/0282113 A1 | 10/2015 | Costa |
| 2015/0296332 A1 | 10/2015 | Lee |
| 2015/0356498 A1* | 12/2015 | Casanova ............ G06Q 10/087 705/13 |
| 2016/0012196 A1* | 1/2016 | Mark .................... G06Q 10/00 705/2 |
| 2016/0105762 A1 | 4/2016 | Singh |
| 2016/0112886 A1 | 4/2016 | Malik |
| 2016/0117213 A1 | 4/2016 | Arjun |
| 2016/0127883 A1 | 5/2016 | Zhou |
| 2016/0127996 A1 | 5/2016 | Patil |
| 2016/0142868 A1 | 5/2016 | Kulkarni |
| 2016/0183042 A1 | 6/2016 | Weizman |
| 2017/0076332 A1 | 3/2017 | Jung |
| 2017/0085417 A1 | 3/2017 | O'Reirdan |
| 2018/0084588 A1* | 3/2018 | Khoury ............... H04M 1/7253 |
| 2018/0160282 A1* | 6/2018 | van de Poll ............ H04W 4/30 |
| 2018/0160334 A1 | 6/2018 | Deshpande |

* cited by examiner

- Transceiver
- Estimator
- GPS Receiver
- WiFi Receiver

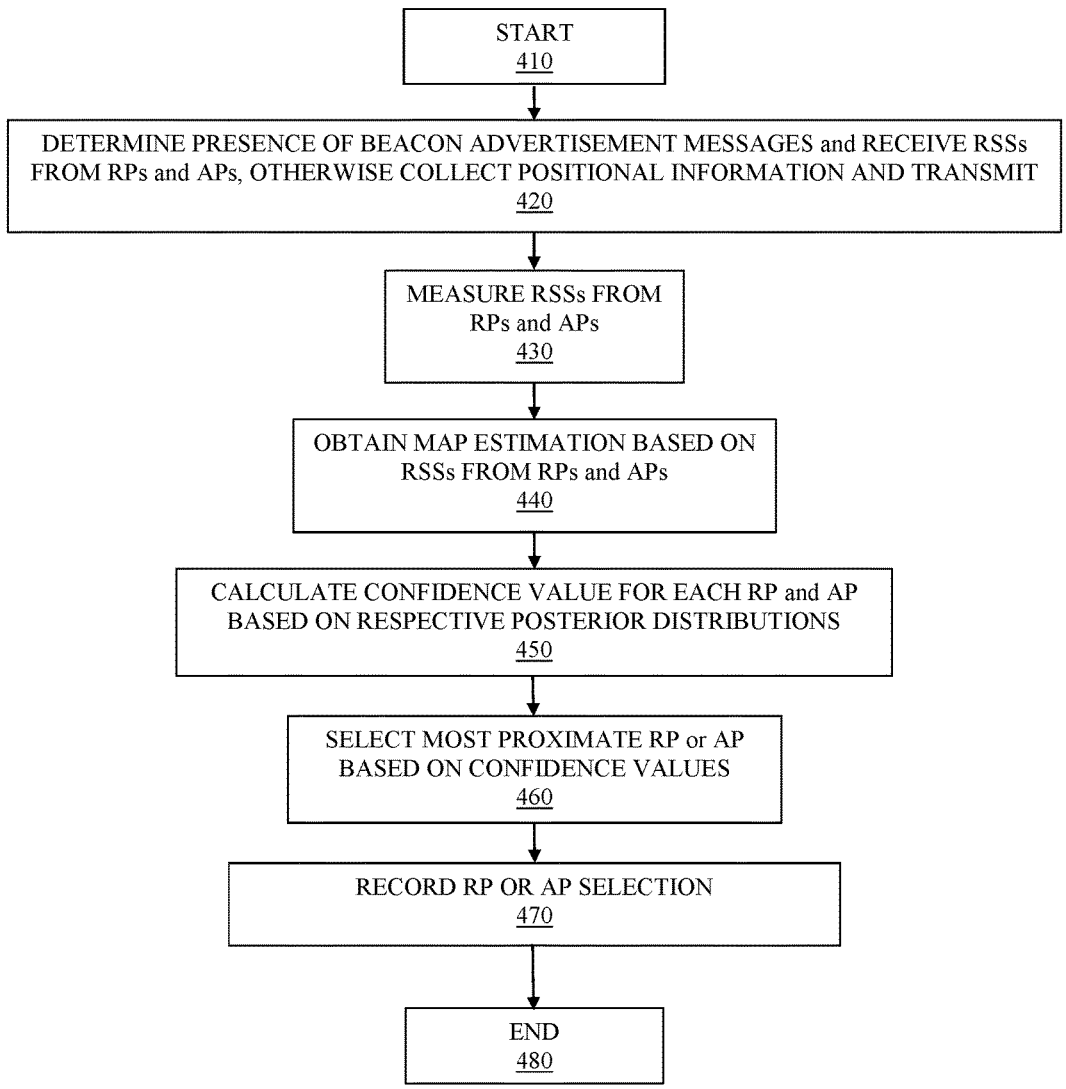

FIG. 7

NETWORK COMPONENT ACTIVITY

| COMPONENT | SCENARIO 1 | SCENARIO 2 | SCENARIO 3 |
|---|---|---|---|
| Stationary AP | 1 | 1 | 1 |
| RP | 1 | 0 | 1 |
| EN | 1 | 0 | 0 |

Legend:

1 = Awake
0 = Sleeping

BLE NETWORKING SYSTEMS AND METHODS PROVIDING CENTRAL AND PERIPHERAL ROLE REVERSAL WITH INDEPENDENT PERIPHERAL NETWORK CONNECTIVITY

FIELD OF THE DISCLOSURE

Disclosed embodiments relate to wireless communications, and more specifically, to wireless communication among BLUETOOTH Low Energy (BLE) equipped devices in which conventional BLE central and peripheral roles of those devices are reversed and made applicable to nodes of a BLE-enabled network so as to enhance BLE networking capability by providing independent peripheral network connectivity.

BACKGROUND

Circa 2009, the Internet was in a stage of its evolution in which the backbone (routers and servers) was connected to edge nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the edge nodes will be comprised substantially of such small devices.

Within the small-device segment, the sub-segment that has the greatest growth potential is embedded, low-power, wireless devices. Networks of such devices are described as comprising the Wireless Embedded Internet ("WEI"), which is a subset of IoT. More particularly, the WEI includes resource-limited embedded devices, which typically are battery powered, and which are typically connected to the Internet by low-power, low-bandwidth wireless networks ("LoWPANs").

The BLUETOOTH Special Interest Group devised BLE particularly in consideration of IoT devices and applications which do not rely upon continuous connection(s), but depend on extended battery life. A good example of these devices includes a temperature sensor which intermittently provides temperature readings to a collector device that collects such readings. That is, continuous connection between the sensor and collector is not necessary to obtain, for example, such temperature reading at a discrete point in time.

The BLUETOOTH specification governing operation of BLE devices relates definitional roles to each of the above sensor and collector as peripheral and central, respectively.

In accordance with customary BLE networking operations, a peripheral, such as a sensor above, makes its presence known to any central, such as a collector above, merely by continuously "advertising" its presence. In other words, the peripheral continuously sends beacon advertisement messages for recognition by a central that itself decides whether connection with the recognized peripheral should occur. In a BLE environment, such advertising occurs across three advertising channels, or frequencies, so as to reduce instances of interference among signals sent by multiple peripherals.

Yet, existing within such a BLE environment are several impediments to optimal communication between a peripheral device, such as an end node (EN), and a central device, such as an access point (AP).

An example of such an impediment exists in the form of an uncertainty that a peripheral device may experience in actually knowing why its broadcast advertisement has not been acknowledged by a central device. Specifically, such uncertainty exists due to the peripheral's inability to know whether a central device is in a range enabling receipt of its advertisement, or additionally, whether a central device that is in range is simply overloaded such that it has not had sufficient time or capacity to process the peripheral's advertisement.

Yet a further impediment that exists to an optimal relationship between a peripheral and central is congestion across the advertising channels leading to opportunities for signaling collision and missed advertisements, each of which causes a lack of connection. These failures are prevalent in scenarios in which multiple peripherals are co-located, i.e., disposed in or at a same space within a structure such as a building or other venue in which peripheral and central functionality are required or desired.

A still further impediment to BLE networking exists in the fundamental complexity brought about by the conventional BLE peripheral/central relationship. In this relationship, a mobile peripheral which moves out of range of a central such as a first network access point (AP) to which it had previously connected essentially loses any established relationship that such peripheral made with that first AP. In this case, when the peripheral moves within range of another, second AP, this second AP is not immediately able to know, due to the established relationship of the peripheral with the first AP, whether a connection should be made in view of considerations including network configuration, security and authentication. The only basis for informing the second AP whether connection with the peripheral should occur is information it receives from a coordinating application running on the BLE network and that provides information to APs concerning whether connection should be made with a peripheral as a result of its broadcast advertisement. However, by the time the coordinating application learns of the lost connection with the first AP in the above scenario, a considerable amount of time has elapsed before connection information can be, or is, provided by the coordinating application to the second AP in order to allow it to determine that it should connect with the peripheral. Thus, in these ways, it will be understood that enabling connection with a peripheral moving among several APs is not only complex, but further disadvantages exist insofar as increased connection latency and a higher utilization of backhaul due to necessary information that must flow to and from the coordinating application.

Thus, it would be desirable to provide for one or more optimized BLE networking relationships that address and overcome the aforementioned impediments and disadvantages now associated with the conventional BLE central/peripheral networking relationship discussed above. More specifically, it would be desirable to provide applicability of such optimized BLE relationships in connection with various application environments such as, for example, providing healthcare, improving fitness, improving internet connectivity, improving proximity sensing, improving alert systems, improving jobsite monitoring, improving systems controlling access, improving automation and improving systems and methods for tracking the location of assets, such as those, for example, which are to be inventoried, whether in a commercial or residential setting, as well as any other application in which a BLE networking protocol is deployed.

In association with such optimization, it would be further desirable to, for example, coordinate the tracking of such assets as those assets are in transit between multiple locations, and, for instance, relative to a final, target destination.

In the above regards, it may be the case that EN accessibility to a given AP may sometimes be hampered to the extent that such accessibility may be deemed non-existent. Any number of factors, including radio frequency (RF) interference and physical barriers may contribute to the inability to achieve the aforementioned tracking and obtaining of information necessary for optimizing one or more of the above application environments. Accordingly, it would be desirable to employ an independent capability for allowing the location and other information of an EN to be determined, such that reliance upon an AP and its network connectivity is unnecessary.

With respect to the above optimizations and manner therefor, commonly owned application Ser. Nos. 15/626,083, 15/927,388 and 15/957,025 are hereby incorporated by reference in their entireties.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes a locator configured to collect positional information determinative of a location of the EN, and a communicator operatively coupled with the locator to transmit an identity of the EN and the positional information directly to a network via a wireless backhaul so as to enable a determination of the location of the EN by the network, based on the transmitted positional information.

A further aspect of the embodiments includes a method of operating a BLE end node (EN), including determining whether a beacon advertisement message has been received from a BLE source thereof, and if the beacon advertisement message has been received, estimating, via an estimator carried by the EN, a proximity to the source. The method further includes determining whether the source is at a nearest proximity from among a plurality of sources transmitting beacon advertisement messages received by the EN, and in response to the source being at the nearest proximity, transmitting an identity of the EN and identifying information of the source to a network so as to enable a determination of the location of the EN by the network, based on the identifying information. Also, if the beacon advertisement message has not been received, the method further includes collecting positional information determinative of a location of the EN, and transmitting the identity of the EN and the positional information directly from the EN to the network, via a wireless backhaul, so as to enable a determination of the location of the EN by the network, based on the positional information.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein:

FIG. 3A is an illustration of a BLE EN in accordance with FIG. 3;

FIG. 4 is a sequence diagram of transmission of information from the BLE EN, depending on proximity association of the BLE EN with a BLE AP and/or a BLE RP, in accordance with FIG. 3;

FIG. 7 is a table setting forth exemplary BLE network component activity according to scenarios for such activity.

DETAILED DESCRIPTION

Figure 1:
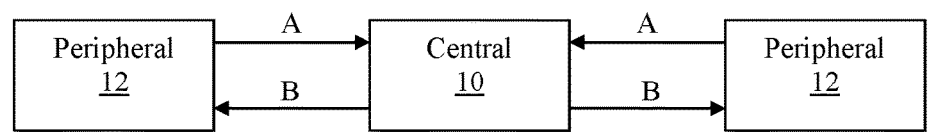
FIG. 1 is an illustration of BLE transmission of a beacon advertisement message between a BLE central and a BLE peripheral, according to the related art.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

BLE networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point (AP), or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Typically, in the context of BLE communications, one or more of these devices assume the roles of a central 10 and a peripheral 12, as shown in FIG. 1. A peripheral is generally understood as a device which merely broadcasts, or advertises, its presence toward another device referred to as a central, with the intent that such presence be detected by that central. The broadcast generally takes the form of a beacon advertisement message transmitted as a radio frequency (RF) signal. Should detection occur, it is also generally understood that it is the central that determines whether a connection with the peripheral should occur. If the answer to that determination is in the affirmative, the central establishes a connection, and also prescribes all conditions under which any connection with a peripheral is to be made. The directional flow of transmission of the beacon advertisement message comprising a RF signal from the peripheral is shown by arrows "A," in FIG. 1, while the directional flow of establishment of a connection with the peripheral by the central is shown by arrows "B."

Such a scheme renders BLE networking susceptible to the many shortcomings discussed hereinabove.

Thus, in an effort to address those shortcomings, embodiments disclosed herein reverse the directional flows of transmission of the beacon advertisement message and connection so as to thereby reverse the roles of a conventional central and a conventional peripheral, and make such role reversal applicable to appropriate nodes in a BLE-enabled network.

Figure 2:
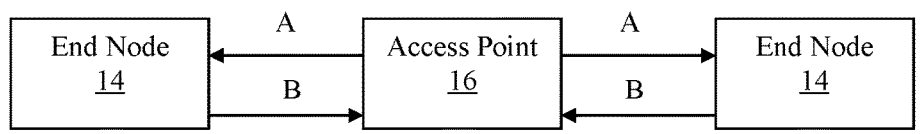
FIG. 2 is an illustration of BLE transmission of a beacon advertisement message between a BLE end node (EN) and a BLE access point (AP), according to embodiments disclosed herein.

FIG. 2 illustrates such reversal of roles insofar as each of exemplary battery-powered BLE end nodes (ENs) 14 are responsible for detection of a beacon advertisement message transmitted from an exemplary battery-powered BLE access point (AP) 16 in the direction of arrows "A," and moreover, whereby such ENs 14 are solely responsible for evaluating and/or determining whether to initiate and/or establish a BLE connection with the AP 16, as shown in the direction of arrows "B." That is, in no way is the AP 16 responsible for evaluating and/or determining any aspect or aspects of whether to make a connection between a respective AP 16 and a respective EN 14, and whereas such aspect or aspects, rather, are solely evaluated and/or determined by the EN 14 so that the EN 14, itself, is enabled to then solely initiate and/or establish the aforementioned connection, if doing so is deemed appropriate by the EN 14. Herein, the term, "initiate" means taking any initial steps or enacting any initial procedures, and the terms, "establish," or "established" mean taking any steps or enacting any procedures related to whether to cause and/or maintain a connection between an AP 16 and an EN 14, and thereafter making and/or maintaining such connection.

Figure 3:
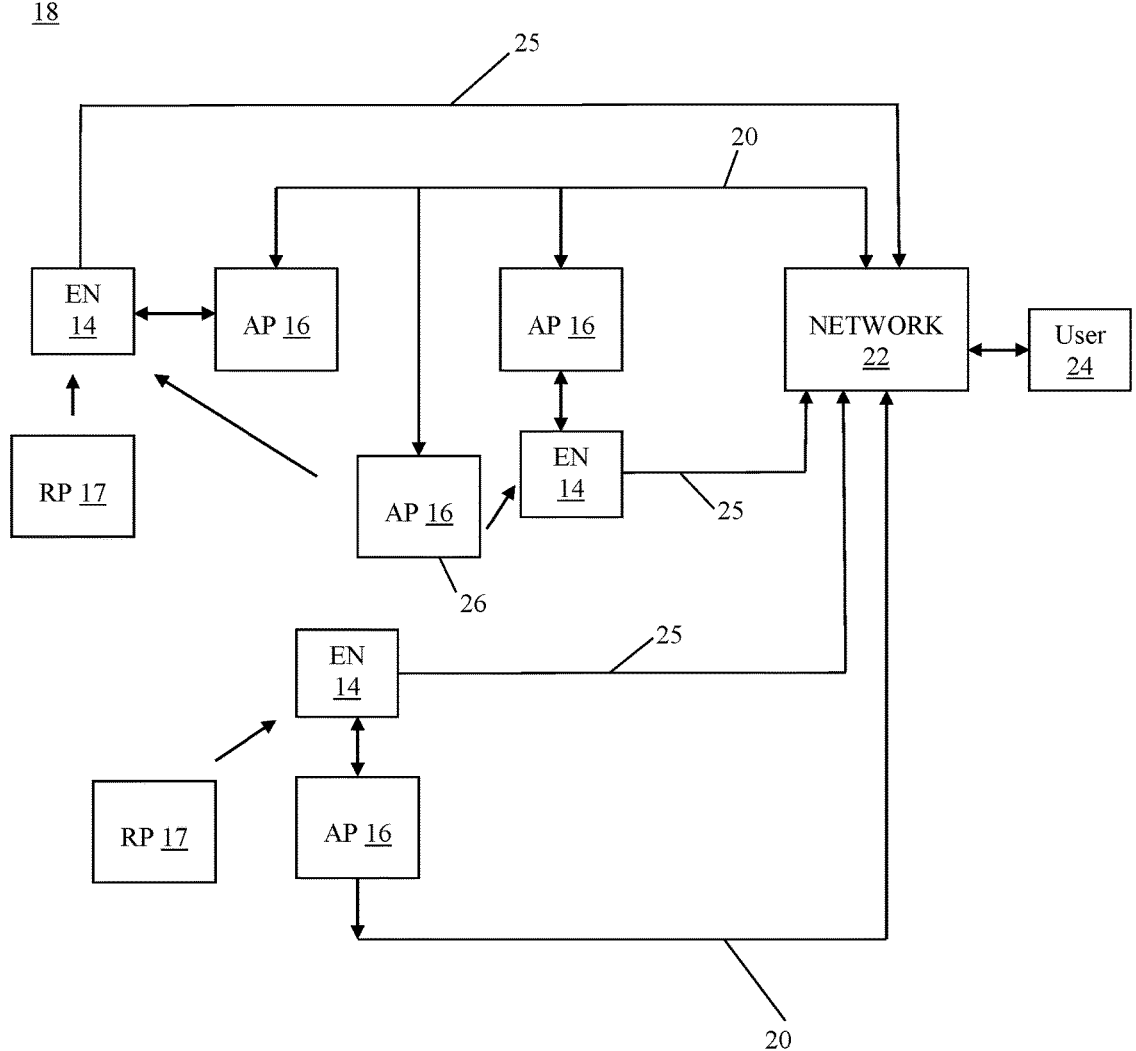
FIG. 3 is an illustration of a BLE-enabled network in accordance with FIG. 2.
Figure 5:
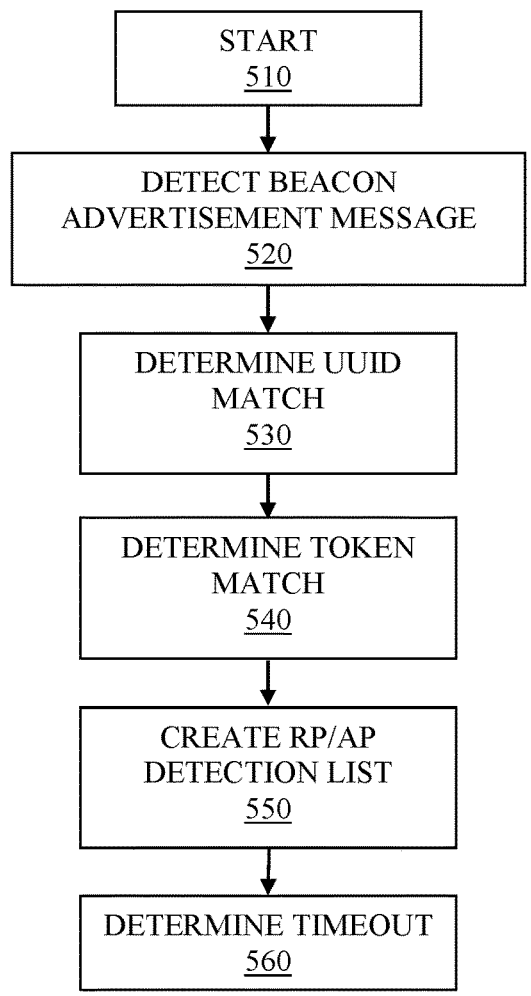
FIG. 5 is a sequence diagram of detection, by a BLE EN, of a BLE AP and/or BLE RP, in accordance with FIG. 3.
Figure 6:
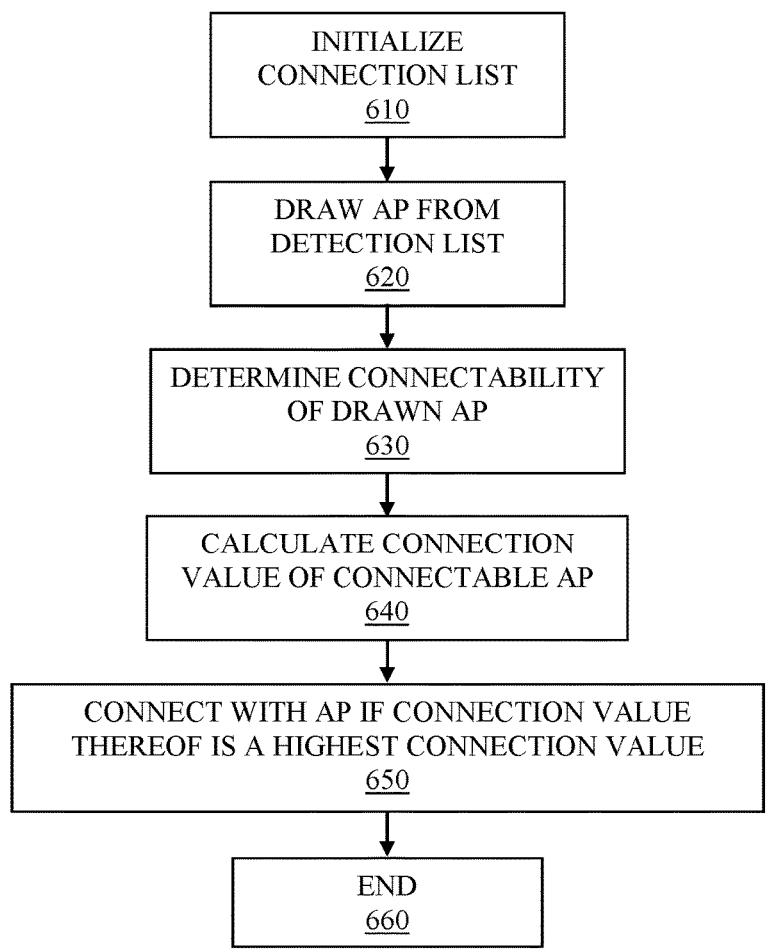
FIG. 6 is a sequence diagram of connection, by the BLE EN, with the BLE AP, in accordance with FIGS. 3 and 5.

FIGS. 3-6 and their accompanying descriptions below address various manner of associating an EN 14 to an AP 16, or a BLE reference point (RP) 17 that is configured to transmit a beacon advertisement message, though unable to transmit information downstream therefrom. Therein, FIG. 3 illustrates a BLE-enabled network and communications system thereof, FIG. 3A is an illustration of a BLE EN in accordance with FIG. 3, FIG. 4 illustrates a manner of proximity association of a BLE EN to a BLE AP or BLE RP, FIG. 5 illustrates a manner of detection, by a BLE EN, of a BLE AP and/or BLE RP, and FIG. 6 illustrates a manner of connection, by a BLE EN, with a BLE AP. Throughout, it is to be understood that an EN 14 does not, at any time, transmit to an AP 16 its location, but rather, the location of the EN 14 may be determined by relative association of one or more APs 16 and/or RPs 17 should they be detected by the EN 14.

Specifically, FIG. 3 illustrates a BLE-enabled network 18 and communications system thereof according to the present embodiments in which ENs 14 detect a received signal strength (RSS) of all beacon advertisement messages transmitted from the APs 16 and RPs 17, solely determine proximity with respect to the APs 16 and RPs 17, and further, solely initiate and establish all connections therebetween the ENs 14 and APs 16, in response to having evaluated and/or made a decision with respect to, for example, such RSS, information contained in the beacon advertisement message, and/or other information, as discussed below in regard to FIGS. 4-6. Once a connection between an EN 14 and an AP 16 is made, data such as, optionally, identifying information, other than location information, of the EN 14 and identifying information of, other than the connected AP 16, the most proximate AP 16 or RP 17, and contained information of the EN 14 including, for example, sensory information thereof, may be transferred to the respective AP 16 for delivery through a backhaul 20, implemented by a cellular, WiFi, or Low-Power, Wide-Area Network (LPWAN) configuration, to a network or cloud service 22 for transfer to an end user terminal 24, such as a personal computing or other electronic device enabled to convey the aforementioned information. Pertinent, unique identifying and/or location information of the APs 16 and RPs 17, such as their media access control (MAC) address, is included in each of their transmitted beacon advertisement messages and are known to the network 22. Such network or cloud service 22 includes any one of available data and connectivity platforms to allow users of nodes within network 18 to, for instance, manage and distribute information pertinent to the nodes and/or information desired in the administration of the nodes. An example of such a platform is CONDUCTOR, available from Link Labs, Inc. of Annapolis, Md.

As mentioned, EN 14 may transmit to the network 22 its own identifying in the form of, e.g., its MAC address, and other collected information, along with identifying information of the AP 16 or RP 17 which is most proximate to the EN 14. In this regard, such transmission may occur through one of two ways. Firstly, an EN 14 may transmit independently of an AP 16, through use of its own network connection capability. To do so, each EN 14 is equipped with appropriate hardware and/or software so as to send and receive information via an available backhaul 25. The backhaul 25 may comprise a LPWAN configuration, or be embodied as a network operated by a cellular provider, such as, for example, VERIZON, for delivery and receipt of information directly to and from network 22. When in the form of the LPWAN configuration, each EN 14 comprises an LPWAN transceiver and/or software compatible with, for example, the LPWAN solution known as SYMPHONY LINK, and available from the aforementioned Link Labs, Inc., though other solutions are also contemplated. In this way, backhaul 25 may be implemented so as to reduce the costs and occasional unavailability of cellular transmission. When in the form a cellular network, each EN 14 comprises a cellular transceiver in accordance with, for example, Global System for Mobiles (GSM), or Long-Term Evolution (LTE), including Cat-M1 or NB-IoT. Secondly, an EN 14 may transmit through a connected AP 16 (as explained in detail below).

Further, it is to be understood that, while communications between an EN 14 and AP 16 are discussed herein in the context of the BLE protocol, it is contemplated that such communication may also be optionally achieved according to another wireless protocol, as appropriate. Also, it is to be understood that EN 14 and AP 16 are exemplary of first and second network nodes, respectively, which may be similarly configured as are EN 14 and AP 16 to carry out communications with respect to the BLE networking described herein and/or according to the other, appropriate wireless protocol discussed above.

In an exemplary case in which a respective EN 14 is mobile, the EN 14 is configured with a locator comprising an estimator implemented by all appropriate software and/or hardware for estimating proximity to a given AP 16 or RP 17, based on RSS, and is also configured with appropriate software and/or hardware for performing all operations associated with initiating and/or establishing a connection with an AP 16.

The estimator conducts a Bayesian Estimation, and specifically a maximum a posteriori (MAP) estimation for each AP 16 or RP 17 encountered by the mobile EN 14 at the time of the encounter, i.e., at the time of receipt of a single or multiple beacon advertisement messages, so as to account for either a single RSS, or alternatively, multiple RSSs. In other words, the MAP estimation may reflect either (1) a single RSS at the time of receipt of a beacon advertisement message from the respective AP 16 or RP 17 or (2) in order to mitigate RF hopping, a predetermined number of consecutive RSSs, e.g., five RSSs, resulting from multiple beacon advertisement messages from the respective AP 16 or RP 17. Furthermore, the EN 14 and its estimator may also be configured to undertake the MAP estimation at any time during operation of the EN 14. The estimation is given by the following Equation (1), $$p(x_t|y_{1:N}) = P(y_{1:N}|x_{1:N}) \int p(x_t|x_{t-1}) p(x_{t-1}|x_{t-1}) dx_{t-1} \quad \text{Equation (1)}$$

In this way, the posterior distribution, $p(x_t|y_{1:N})$, for a given proximity between a particular EN 14 and AP 16 or RP 17 pair at time, t, is determined. In particular, such determination is made by advancing the next most previous posterior, $p(x_{t-1}|x_{t-1})$ from time, t−1, to the current time, t, given $p(x_t|x_{t-1})$ It is contemplated that a variance of the previous estimate, $p(x_{t-1}|x_{t-1})$, is increased by a predetermined rate. Accordingly, a new posterior estimate may be obtained based on all observations by an EN 14 in accordance with Equation (2), as follows:

Equation (2)

$$p(y_{1:N}|x_{1:N}) = \prod_{i=1}^{N} p(y_i|x_i).$$

Therein, $x_i$ represents a variable distance from an EN 14 to an AP 16 or RP 17, $y_i$ represents a RSS of a single beacon advertisement message or RSSs of several beacon advertisement messages, and N represents a number of observations, i.e., a number of received beacon advertisement messages. In this regard, the highest value, or minimum variance, distribution is chosen as the MAP estimate.

Once the MAP estimate is obtained, a confidence value, representing a level of expectation that a respective AP 16 or RP 17 is most proximate to the EN 14, is calculated for each AP 16 and RP 17 encountered by the EN 14, based on the estimated posterior distribution and Equation (3) below, and insofar as a 10 dB predetermined variance in RSS is set as an optional, acceptable variance therefor:

Equation (3)

$$P_{\overline{10dB}} = 1 - 2Q\left(\frac{10 \text{ dB}}{\sigma_{posterior}}\right).$$

Thus, it is to be understood that another variance level could be set as the predetermined variance depending upon, for example, device configuration(s) of one or more of the AP 16, RP 17, and EN 14.

Selection of an AP 16 or RP 17, as the source of one or more beacon advertisement messages, and making it most proximate to the EN 14, is determined as that which yields the highest confidence value. However, if a further AP 16 or RP 17 yields a next most confident value corresponding to a predetermined tolerance for the confidence value, selection of the AP 16 or RP 17 that is most proximate to the EN 14 is determined from among all of the APs 16 and RPs 17 which have broadcast a beacon advertisement message received by the EN 14. Still further, a signal strength from a respective AP 16 may be adjusted, in accordance with an adjustment factor conferred by network 22 and included in the beacon advertisement message, to confer exclusive selection thereof by the EN 14, i.e., any other AP 16 or RP 17 whose beacon advertisement message the EN 14 has received is excluded from being considered as being most proximate to the EN 14. It is to be understood that the estimator of a particular EN 14 may be configured to create a statistical fingerprint of AP 16 and RP 17 associations so as to optimize interpretation of future association patterns.

In connection with the above, the EN 14 is further configured to self-transmit to the network 22 its own identity, e.g., its MAC address, collected information applicable to an above-discussed application environments, and positional information, i.e., information which is determinative of a location of the EN 14 without reference or attribution to an AP 16 or RP 17, along with any other information pertinent to the EN 14 as described herein. To do so, EN 14, as is shown in FIG. 3A, includes a communicator comprising a transceiver, such as, for example, either a CAT-M1 or other cellular enabled modem, or a LPWAN compatible construction, each of which is respectively operable with backhaul 25. Operatively connected with the communicator is a locator comprising one or more of the aforementioned estimator, a Global Positioning System (GPS) receiver and a WiFi receiver. Optionally, each of the above modem, estimator, and receivers may comprise a system on a chip (SoC), so as to include a microprocessor (not shown).

Because EN 14 includes the above-discussed cellular modem, positional information of the EN 14 may be determined by network 22 according to the cellular ID (CID) of the base transceiver station (BTS) with which the EN 14 is in communication. That is, when transmitting its positional information to the network 22, the CID is delivered upstream to the network 22, which is then enabled to access a mapping of the BTS as administered by a cellular provider with rights to the BTS, such as VERIZON, AT&T or similar network operators. With this mapping, a relative location of the EN 14, comprising the latitude and longitude of the communicating BTS, may be learned and attributed, by network 22, to any EN 14 that transmitted information to the network 22 via its cellular modem.

When configured with a GPS receiver, EN 14 determines its positional information as latitude and longitude as would, for example, a smartphone or other computing device executing GOOGLE MAPS or another known global positioning application.

When configured with a WiFi receiver, EN 14 is enabled to obtain, for one or more wireless local area networks (WLANs), such as a WiFi network or networks, positional information including received signal strength indicators (RSSIs) for detected networks, service set IDs (SSIDs) representing a name of a particular WiFi network, and basic service set IDs (BSSIs) representing the MAC address of access points within the detected network. With this information, and particularly BSSIs for detected networks, the EN 14 is then able to communicate detected addresses to network 22. Network 22 then coordinates access to positioning databases for WiFi networks, including, for example, that which is administered by GOOGLE. Through this coordination and matching of these addresses, a relative location of the EN 14, comprising a latitude and longitude for the detected addresses, may be determined and attributed, by network 22, to the EN 14.

When configured with any combination of location determining software and/or hardware including the estimator, GPS receiver and the WiFi receiver, as described above, network 22 is configured to calculate and determine the relative location of the EN 14 within a predetermined tolerance of positional latitude and longitude coordinates. Such determination may occur, for instance, in a case in which the network 22 determines a location of an EN 14 using a combination of, for example, GPS coordinates and WiFi derived coordinates, though other combinations are contemplated. For example, such another combination may comprise a known location of the most proximate source of received beacon advertisement messages, GPS coordinates and WiFi derived coordinates.

In one or more embodiments, operability of the communicator and locator may be executed according to an application comprising a set of computer-readable instructions configured to be stored on and accessible by a computing device, such as a smartphone or other personal computing device, for execution thereby. This way, such a computing device may be transformed to comprise the EN 14 so as to leverage the operating system, GPS, WiFi and other data collection capabilities thereof.

FIG. 4 sets forth a sequence of the above self-transmission of an EN 14 according to the first mode of operation thereof, including association of a respective EN 14 to a respective AP 16 or RP 17.

Therein, flow begins at decision block 410 and proceeds to decision block 420 at which an EN 14 determines the presence of beacon advertisement messages and receives RSSs from one or more APs 16 or RPs 17. If no messages are detected, EN 14 collects positional and other information thereof, and transmits that corresponding information directly to network 22. In this way, EN 14 is configured to directly collect and transmit to the network 22 at least GPS and/or WiFi positional information that is determinative of its own location independently of the presence of an AP 16 or RP 17, and which may be used by network 22 to arrive at a relative location of the EN 14. An exemplary situation in which such direct transmission may occur arises when RF interference blocks the receipt of beacon advertisement messages or when the EN 14 travels from an indoor location to an outdoor location whereat no AP 16 or RP 17 is present. Thus, it will be understood that an EN 14 first attempts to detect a proximity to one of several APs 16 and RPs 17, prior to self-transmission of positional information including CID, WiFi and GPS associations.

If messages are detected, however, as may be the case when EN 14 travels from an outdoor location to an indoor location in which one or more APs 16 and RPs 17 are present, EN 14, at decision block 430, first measures the RSSs of respectively transmitted beacon advertisement messages. At decision block 440, the estimator, which is configured integrally with the EN 16, calculates a MAP estimation for each, or a collection, of the respectively transmitted RSSs. Subsequently, at decision block 450, EN 14 calculates a confidence value from each of the respectively estimated posterior distributions. At decision block 460, the AP 16 or RP 17 yielding a highest confidence value is selected as the most proximate AP 16 or RP 17 to the EN 14. Flow then proceeds to decision blocks 470-480 in response to the selection by the EN 14. At decision block 470, EN 14 records the selection of the AP 16 or RP 17 according to identifying information thereof, including, for example, its MAC address or other appropriate networking identifying information. At decision block 480, the proximity association process ends.

Furthermore, it is contemplated that EN 14 may modulate its behavior depending upon certain conditions. For example, EN 14 may vary the frequency with which it conducts its MAP estimate depending upon whether the EN 14 is stationary or moving. That is, EN 14 may perform its estimation more frequently if it is moving, and less often if it is stationary. Still further, EN 14 may be configured to perform some predetermined action depending upon whether it is at a predetermined location (e.g., activate a light-emitting device (LED) or alarm) and/or whether no further AP 16 or RP 17 is detected (e.g., deactivate a device).

FIGS. 5-6 address situations in which connection to one or more APs 16 is available. If such connection is unavailable, then a mobile EN 14 will self-transmit using backhaul 25. This way, an EN 14 is configured to optimize its power consumption and use of cellular resources, which can oftentimes be quite expensive, by seeking to first detect a BLE connection to the network 22, and only thereafter in the absence of that connection, resort to self-transmission via backhaul 25.

Thus, assuming availability of the above connection, the mobile EN 14 must decide which AP 16 to connect with, and to which it may transmit the identifying information of the most proximate AP 16 or RP 17. This decision is based on the attainment by a respective AP 16 of a highest connection value calculated by the mobile EN 14. That is, as a mobile EN 14 moves in proximity to one or more APs 16, the value of connection with any one of the APs 16 is assessed based on several components including the confidence value, in accordance with FIG. 4, and an associated weighting factor, a network loading value and an associated weighting factor, and an association factor of the broadcasting AP 16, and is given by the following Equation (4):

$$\sigma = \alpha \cdot P + \beta \cdot L + \gamma, \text{ in which} \qquad \text{Equation (4)}$$

σ represents the connection value, as an absolute value, α represents a weighting factor assigned to the confidence value calculated by the EN 14, P represents the confidence value, β represents a weighting factor assigned to loading of the connected network, L represents a loading value of the connected network and is included in the beacon advertisement message, and γ represents an association factor for a respective AP 16, such that γ equals zero if the EN 14 has not made a previous connection with the respective AP 16 and equals a predetermined highest value if the respective AP 16 is the AP 16 with which the EN 14 has made a most previous connection.

In this way, an EN 14 that moves among various APs 16 and RPs 17 may determine an optimal connection among such APs 16 based on the aforementioned components yielding the highest connection value in accordance with Equation 4.

Once such connection is made, as indicated by the exemplary double arrows of FIG. 3, the connected AP 16 may receive from the EN 14 the identifying information of another AP 16 that is most proximate in a case in which the connected AP 16 has been determined to have attained the highest connection value, but not the highest confidence value. The other, most proximate AP 16 may comprise a connectable AP 16, as indicated at 26 in FIG. 3, for example, to which connection has not been made due to it not achieving the highest connection value. Thus, it is to be understood that the consideration of the confidence value in Equation 4 increases the likelihood that the most proximate AP 16 is the one to which EN 14 connects. However, this scenario is not certain given connectability of one or more APs 16 and other considerations used in determining the connection value according to Equation 4.

The manner of determining the above optimal connection at the mobile EN 14 is demonstrated by the flow of FIGS. 5-6. FIG. 5 provides a sequence for scanning for detection of a beacon advertisement message respectively transmitted from one or more APs 16, while FIG. 6 provides a sequence for determining an AP 16 with which the EN 14 should connect, based on the above-discussed connection value, a, as determined in accordance with Equation 4.

Flow begins in FIG. 5 at decision block 510 and proceeds to decision block 520 at which EN 14 scans for and detects a respective beacon advertisement message from one or more APs 16, whose identifying and/or location information is known to the network 22. Thereafter, at decision block 530, EN 14 processes a detected beacon advertisement message to determine a Universally Unique Identifier (UUID) match wherein identifying data of the AP 16 broadcasting the beacon advertisement message is confirmed as belonging to the network 22. From there, flow proceeds to decision block 540 to determine and confirm a token match. If a match is confirmed at 540, the broadcasting AP 16 is, at decision block 550, added to a list of detected APs 16 ("detection list") for which decisions at blocks 530 and 540 have been confirmed. During operation of the estimator at decision blocks 520-540, the estimator of EN 14 calculates respective confidence values for the detected APs, and records each of the respective confidence values for the detected APs 16 such that attained confidence value is associated with a respective, detected AP 16 when such AP 16 is added to the detection list, and also its selection of the most proximate AP 16. Thereafter, it is determined at decision block 560 whether the scanning operation has timed out. If not, as in the case of negative decisions at decision blocks 530 and 540, scanning continues. If the scanning operation has timed out, flow proceeds, as shown in FIG. 6, to determine which AP 16, from among the detection list, the EN 14 should connect.

Based on a timeout having occurred and the detection list, flow then proceeds, from decision block 560, to decision block 610 of FIG. 6 so as to initialize a list of APs 16 to which the EN 14 should connect (so as to provide a "connection list"). Once this connection list is initialized, an AP 16, with its associated confidence value, is drawn from the detection list, at decision block 620, at which point it is then determined, at decision block 630, if such AP 16 is connectable to the network 22 of FIG. 3, for example. If the drawn AP 16 is connectable, flow then proceeds, with respect to such drawn AP 16, to decision block 640 whereat a connection value therefor is calculated in accordance with Equation (4). Flow is then iterative through decision blocks 620-640 until detection list provided at decision block 550 is empty. From among respective connection values calculated at decision block 640, EN 14 selects and connects with, at decision block 650, the AP 16 having a highest connection value in accordance with Equation (4), and proceeds to an end at decision block 660 once connection is established.

In this way, the aforementioned proximity determination according to the discussed confidence value serves the dual purpose of both determining which AP 16 is most proximate to an EN 14, and providing a basis for determining which AP 16 the EN 14 should connect. That is, the AP 16 with which the EN 14 ultimately connects may receive identifying information of an RP 17 that is most proximate to the EN 14 so that a relative determination of the location of the EN 14 may be determined with reference to the RP 17. In this way, the granularity of the proximity determination above is increased such that RPs 17, and not only APs 16, are each considered by the estimator of EN 14 so as to render available a more accurate AP/RP/EN proximity association.

Accordingly, as mobile EN 14 moves in and out of range of one or more APs 16, connection with a respective one thereof may be made based upon the aforementioned confidence and connection values, such that the connected AP 16 likewise may yield a highest confidence value so as to be most proximate to the EN 14, and represent the optimal connection according to Equation (4). In this case, such proximity will be made known to the user 24 by virtue of the established connection and the lack of any other AP 16 identifying information being transferred to the network 22.

Such ability of a EN 14 to select and connect with a specified, respective one of APs 16 removes the shortcomings of conventional BLE networking by enabling a mobile EN 14 to have the autonomy necessary to initiate and/or establish connection with an AP 16 solely in response to its own evaluation and decision making with respect to aspects contributing to the aforementioned proximity association, connection value and/or other information associated with the EN 14. For instance, such other information may optionally include one or more parameters relating to operation of the EN 14.

In removing the aforementioned shortcomings, it will be apparent that the embodiments discussed herein eliminate the conventionally overwhelming number of advertisements transmitted by peripherals in conventional BLE networking. That is, the present embodiments substantially reduce the number of advertisements occurring at a given time by virtue of the BLE role reversal, discussed herein, in which plural end nodes receive, rather than transmit, advertisements in the form of beacon advertisement messages from one more access points and reference points.

Once connected, the EN 14 may then transfer its own identifying information, other than location information, and identifying information of the most proximate AP 16 or RP 17. In this way, when information of an AP 16 other than the connected AP 16 is not transferred, it will be understood that the connected AP 16 is most proximate to the EN 14. Concurrently with the transfer of the above information, the EN 14 may also transfer one or more of its contained information including sensory information, access information, notification information, alarm information, and any other status and/or content information thereof as may be applicable to its particular configuration. For instance, it is contemplated that EN 14 may transfer any of the aforementioned types of information so as to be applicable to such environments including a workplace or other type of commercial environment in which commerce is a purpose, a residence, and a medical facility or other facility in which tracking of persons or objects is necessary and/or desired.

In these contexts, an EN 14 may be configured to include all appropriate hardware and/or software for the detection of temperature, light, sound, pressure, humidity, density, moisture, acceleration, voltage, current, material content level and pressure, motion, proximity, magnetism, rotation, orientation, velocity and/or deviation from original condition.

The following examples describe instances of associating a particular end node (EN) 14 to a particular access point (AP) 16 in instances in which the EN 14 first seeks to connect to the network 22 via BLE protocol, prior to attempting self-transmission, so as to conserve resources of the EN 14 and reduce the cost of network connection. Further, such examples are set forth in the context of the BLE-enabled network 18 of FIG. 3 and with the exemplary understanding that an EN 14, which may be defined as a BLE tag and/or a BLE tag attached to or associated with a particular object, is seeking association with a BLE AP 16 that is configured to report information of the tag to an end user 24 via backhaul 20 and network 22. In these regards, it is contemplated that EN 14 and AP 16 may be embodied as being capable of operating according to a BLE protocol or other protocol in which such nodes may operate as respective first and second nodes according to any of FIGS. 4, 5, and/or 6. Also, in these regards, it is to be understood that a respective EN 14 may be configured to calculate its confidence and connections values at the same time, or, at different times. It is to be understood that EN 14 may undertake any of the processes of FIGS. 4-6 at any time, whether the EN 14 is mobile or stationary. Thus, the EN 14 is configured to optimize, at least, a rate at which connection may be established, with respect to, at least, proximity of such connection as well as the efficiency of such connection, as will be understood based on the components of Equation (4).

In a first instance, it is contemplated that such tag is attached to an object, such as a hospital bed for which it is desirous to know the location thereof at any given point in time when it is moving throughout a hospital environment. Thus, assume that the hospital bed, with the tag attached thereto, is transient throughout the hospital, moving from floor to floor and from room to room, as the case may be when a patient is to undergo a particular procedure. At any given point in time, as the bed moves from one location to the next, its whereabouts may be tracked through monitoring achieved by the BLE communications system disclosed herein.

More specifically, as the hospital bed may move throughout a particular floor, it contemplated that it will move among a number of APs and RPs whose location is known to the hospital network. As that travel occurs, the tag attached to the bed will scan for beacon advertisement messages transmitted from the various APs and RPs. Upon receipt of the transmitted signals, the tag is configured to conduct the MAP estimation discussed hereinabove and calculate a highest confidence value for the AP or RP that is in closest proximity at a given point in time. The tag is further configured to connect with a particular connectable AP having a highest connection value, as shown by the exemplary double arrows extending between an exemplary EN 14 and AP 16 of FIG. 3, so that the identifying and other information of the closest proximity AP may then be transferred to the end user. In this way, as the bed and attached tag may continue to move, the process of determining proximity of the tag to both APs and RPs continues until, optionally, such point in time when the bed and attached tag are stationary such that identifying information of a further, different AP or RP need not be reported.

More particularly, and continuing with the example scenario above, the attached tag is alternatively, and optionally, configured to conduct a scan of broadcasting APs and assess their UUID and token information so as to qualify those APs to be included on a detection list resulting from the scan and from which connection with a specified one thereof will occur in order to transfer the tag's identity, identity information of the AP to which the tag is most proximate, and/or contained information of the tag to an end user. Once this detection list is compiled and scanning is completed, embodiments of the present disclosure contemplate the tag being configured to initialize a connection list of APs, from among the APs compiled on the detection list. Once initialized, the tag is further contemplated to conduct a determination of whether an AP is connectable to the network 22 via backhaul 20 so as to be able to transfer information of the tag to an end user desirous of knowing the location of the hospital bed. Each connectable AP is then evaluated as to its associated connection value in accordance with Equation (4) above.

More specifically, the connection value for each AP, that is determined to be connectable to the network 22, is assessed based on components comprising a confidence value representing a level of expectation that a respective AP is most proximate to the tag and an associated weighting factor, a network loading value and an associated weighting factor, and an association factor of the AP. In regard to the association factor, it is contemplated that such factor be deemed to have a value of zero if the tag has not connected with the AP being evaluated, and to have a highest value if the tag has had its most recent connection with that AP. In this way, those connectable APs for whom a connection value has been evaluated by the tag will yield an AP having a highest connection value. As such, the tag will then select that AP as the AP with which to initiate and establish a connection enabling the transfer of pertinent information of the tag, including identity information of the AP to which the tag is most proximate, to the end user.

When considering the above embodiments, it will be understood that APs 16 and RPs 17, as shown in FIG. 3, are stationary with respect to their location, such that a location of an EN 14 becomes attributed to the EN 14, by the network 22, as a result of its proximity and/or connection to a particular stationary AP 16 and/or proximity to a RP 17, the locations of which is known to the network 22 as being fixed.

As has been discussed, however, it will be understood that the EN 14 will, after having first attempted to connect via a BLE AP 16, self-transmit its own positional information to the network 22 in instances where a BLE connection via an AP 16 is not available. This may be the case, for instance, in which only RPs 17 are detected. Such self-transmission, therefore, provides continuity of communications with network 22 despite the absence of a BLE connection.

Thus, it will be understood that the EN 14 will invoke its self-transmission abilities in instances in which no AP 16 is detected. In other words, in a situation in which, for example, the hospital bed moves beyond the hospital building itself to an outside location such as the emergency bay, or experiences an inability to receive any beacon advertisement message, the EN 14 will then employ its GPS and/or WiFi receivers and transmit their corresponding information to network 22. In these ways, the EN 14 exhibits its independence in collecting positional information and transmitting the same such that either a transition from an indoor location to an outdoor location and/or instances of RF interference do not impede the ability of the EN 14 to maintain continuous detection and transfer of information pertaining thereto.

It will also be understood that in any case in which an EN 14 is unable to connect to the network 22 via BLE, it will invoke its positional information collection and self-transmission capabilities so as maintain the ability to determine the whereabouts and other information pertinent thereto.

Optimization of networking procedures and processes, like those embodied hereinabove, is a core aspect of maintaining and enhancing the functionality of network components. This is especially true in the context of BLE devices which are battery powered, and that thus rely on minimized energy use in order to maximize a continuing ability to carry out their networking tasks.

In this regard, many advantages exist in providing component functionality that is centrally coordinated by the network 22 when such components are to engage in tasks such as, for example, asset tracking and relay of desired information. Among these advantages is the ability to obtain maximized component battery life and, thus, the correlating extended time with which a component may function.

As such, network 22 is configured to provision timing for operation of its components including one or more of each of its APs 16, RPs 17 and ENs 14 to perform their networking functionality, as described hereinabove, according to coordinated scheduling. More specifically, the scheduling is configured to provide both active, i.e., awakened, and sleep modes/states for all of the stationary APs 16, all of the RPs 17, or all of the ENs 14, and respective subsets thereof, based on a common network 22 system time to which such components may be periodically re-synched to compensate for individual clock drift. In their active mode, the aforementioned components perform their respective functionalities as described hereinabove, while in sleep mode such functionalities are suspended for the appropriate duration as provisioned by network 22. Such active and sleep modes may be configured to occur during any of the following periods, including in real time, or during a discrete scheduling period, e.g., over the course of a predetermined interval or number of hours, or during maintenance of some or all of the network components, or during a combination of the aforementioned.

Furthermore, and based on the scheduling, network 22 is also configured to impart alternate functionality, i.e., functionality other than that which has been described above, for respective ones of the aforementioned components, as discussed below.

Thus, the confluence of variously provisioned timing and corresponding component functionality is presented according to a number of activity scenarios detailed in FIG. 7. Therein, at least three scenarios, including Scenario 1 (S1), Scenario 2 (S2), and Scenario 3 (S3) are illustrated with respect to network 22 provisioned timings for active and sleep modes among APs 16, RPs 17, and ENs 14. In these respects, it will be understood that any of the APs 16, RPs 17, and ENs 14 may initially be configured according to the network 22 system time so as to be active or asleep with respect to a particular scenario. APs 16 and ENs 14 are contemplated to receive and apply network provisioning through their regularly conducted network communications as described herein. RPs 17, on the other hand, are each contemplated to receive network provisioning enabling their operation according to S1-S3 by virtue of initial programming as an EN 14. That is, an RP 17 will, in order to operate according to S1, S2, or S3, be configured to first function as an EN 14 so as to listen for the network being broadcasted by an AP 16 and/or RP 17. Once detected, the RP 17 may then connect to the network 22 through an AP 16 in order to retrieve mailbox messages containing its configuration data. Once retrieved, the RP 17 may then function according to that configuration data with respect to a particular scenario.

In S1, each of the APs 16, RPs 17 and ENs 14 operate, according to network 22 provisioned timing, in active mode so as to function as described above in connection with FIG. 3. That is, ENs 14 actively detect beacon advertisement messages transmitted from APs 16 and RPs 17 so as to, in accordance with Equations (1)-(4), determine their most proximate access point as well as that to which a connection should be initiated for the relay of information to and the receipt of information from the network 22. Once regularly scheduled tasks are completed, each of these components is configured to lay dormant, or asleep, until the occurrence of a next wakeup time defined by the provisioned timing. Notably, ENs 14 may check their mailbox messages when connected through an AP 16, and also act in accordance with information relayed to the network 22, which is thereafter analyzed by the network 22 to determine necessary adjustments to be relayed back to the ENs through an established connection. For example, in a situation in which an EN 14 relays sensor data such as a temperature reading, an EN 14, if so configured, may sound or otherwise indicate an alarm in response to receipt of messaging from network 22 to do so as a result of an evaluation by network 22 that doing so is appropriate. Additionally, an EN 14 may, when connected to network, receive adjustments for one more parameters and conditions affecting those parameters including, for example, heartbeat interval and latency. Also, an AP 16 may obtain its own an adjustment of one or more parameters thereof and conditions affecting such parameters. Such parameters may include, for one or more of the APs 16, a RSSI offset (dBm), a location offset (dB), a level of transmission power (dBm), or latency, or advertising rate, or a combination thereof, in which the location offset represents an adjustment of RSSI of an AP 16 to bias selection thereof as most proximate according to Equations (1)-(3).

S2 contemplates, as is shown in FIG. 7, an instance in which network provisioned timing causes each of the APs 16 to be active, while the ENs 14 and RPs 17 are asleep. Here, since no connection can be initiated by a respective EN 14 due to its sleep state and since a respective RP 17 is unable to connect with the network 22, APs 16 are configured to, through time-division multiplexing, operate as centrals 10 according to FIG. 1. That is, APs 16 may further function to receive beacon advertisement messages from peripherals that do not function as ENs 14, i.e., peripherals 12 according to FIG. 1. As a result of such receipt, the APs 16 obtain the MAC addresses of the transmitting peripherals 12 and conduct a measurement of RSSI. In this way, network 22 may then receive the MAC addresses and the RSSI measurements, and determine a relative location of the transmitting peripherals 12 based on their beacon advertisement messages. Additionally, APs 16 may, if configured with spectrum analysis capability, also analyze and report to network 22 other RF signals which are detectable.

Still referring to FIG. 7, a third scenario of provisioned network timing is defined by S3. In this scenario, all or subsets of the APs 16 and all or subsets of the RPs 17 may be configured to operate in active mode synchronously while ENs 14 are asleep. Such synchronous operation enables the leveraging of alternate modes of operation as described below.

Notably, the absence of RP connectability to network 22 in this scenario, as well as in S2, triggers RPs 17 to begin by operating as an EN 14 so as to receive their initial network 22 provisioning for the given scenario through an available connection.

Thus, a first alternate mode of operation entails each of the RPs 17 being configured to function as an EN 14, in response to receipt of the aforementioned provisioning. This way, an RP 17 may then connect with an AP 16 to check for mailbox messages on network 22 and receive configuration messages suitable to trigger operation according to S1 or S2.

Additionally, a second mode of operation according to S3 entails all or subsets of each of the APs 16 and RPs 17 sequentially switching their operability to that of an EN 14. In this example, an RP 17 would first switch its mode of operation to that of an EN 14, and then an AP 16 would do likewise. As such, an RP 17 is enabled to obtain its mailbox messages and evaluate its proximity and connection determinations according to Equations (1)-(4).

Notably, S3 affords the opportunity to obtain RSSI measurements based on beacon advertisement messages transmitted by APs 16 and RPs 17 that have not switched to operate in accordance with S3, i.e., are operating according to their functionality as prescribed by S1 while awaiting sequential switching as prescribed by S3. For example, in a case in which RPs 17 have switched to operating as an EN 14, RSSI measurements may be obtained by the RP 17 for beacon advertisement messages transmitted from APs 16 that have that are awaiting sequential switching as prescribed by S3. This way, an RP 17, operating as an EN 14, is enabled to transmit a heartbeat message, i.e., a message sent by the EN 14 to the network 22 which informs the network 22 of the communication state of the EN 14, that includes the MAC address of the APs 16 which are deemed most proximate, the MAC address of the AP 16 to which it connected, the RSSI measurement for the received beacon advertisement message(s), and its own RP transmit power level and RSSI offset. In another example, in a case in which APs 16 have switched to operating as an EN 14, which occurs upon the RPs 17 terminating connection to the network 22, such APs 16 may obtain RSSI measurements for beacon advertisement messages transmitted from RPs 17 that are awaiting sequential switching as prescribed by S3. As such, an AP 16, operating as an EN 14, is enabled to transmit through its backhaul 20, the MAC address of the RP 17 or RPs 17 that transmitted the received beacon advertisement message(s), the RSSI measurement for the received message(s), and its own AP transmit power level and RSSI offset. In this way, an AP 16, through time-division multiplexing, operates as both an EN 14 according to S3, as well as according to its S1 functionality for the transfer to and the receipt of information from the network 22.

Accordingly, the network 22, through adaptation of a tuning function thereat, may then deliver through a connected AP 16 an adjustment of one or more parameters thereof and conditions affecting such parameters, as well as those of RPs 17 when connected through an AP 16. Such parameters may include, for one or more of the RPS 17 and APs 16, a RSSI offset (dBm), a location offset (dB), a level of transmission power (dBm), or latency, or advertising rate, or a combination thereof, in which the location offset represents an adjustment of RSSI of a RP 17 or AP 16 to bias selection thereof as most proximate according to Equations (1)-(3).

In this way, S3 offers the ability to achieve and obtain an overall mapping of transmission activities and their associated parameters for all or respective ones of the APs 16 and RPs 17. Based on this mapping, the accuracy of location determination, and overall system performance due to an ability to control battery consumption, owing to optimization of transmit power level, for example, are enhanced.

In each of S1 through S3, it is to be noted that operation of one or more ENs 14, and operational modes of other components operating as ENs 14, may be adjusted by network 22 to execute extended periods of sleep after detection of no access points or a same access point. With respect to that detection, such ENs 14 may also be provisioned to adjust the rate at which heartbeat messages are transmitted in response to detection of specific parameters contained in a transmitted beacon advertisement message including, for example, a predetermined RSSI for which the ENs 14 have been configured to detect.

Accordingly, each of the above scenarios serves to optimize the utilization of network components by coordinating the effective use of battery consumption, while at the same time leveraging different modes of component operation to make adjustments affecting that consumption.

Figure 8:
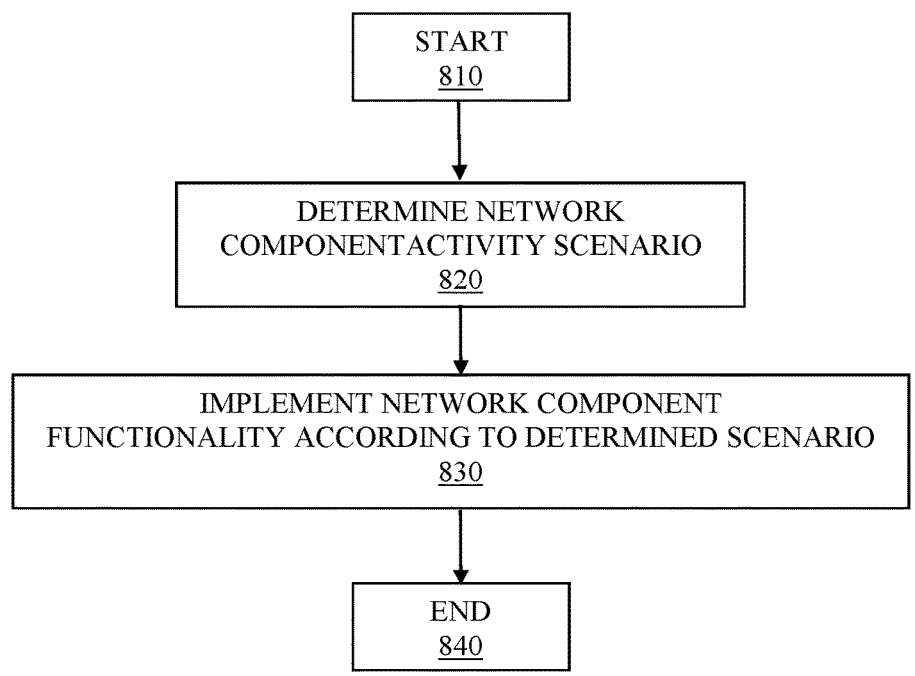
FIG. 8 is a sequence diagram for implementation of a respective scenario of FIG. 7.

In referring to FIG. 8, there is shown a process for operation of the network components associated with S1 through S3 that starts at decision block 810 and proceeds to decision block 820. Thereat, network 22 determines the operable scenario of network component activity among S1 through S3. In accordance with the determination, each of the applicable network components is configured, whether through network provisioning or initial setting, to be operable in either an active mode or a sleep mode. At decision block 830, network components and network 22 implement predetermined network component functionality according to the determined scenario. Multiple scenarios may be implemented cyclically. Once the network 22 has determined that the application environment pertinent to the one or more scenarios is fulfilled, the process ends at decision block 840.

One or more of each of the APs 16, RPs 17 and ENs 14 are contemplated to be cooperable according to S1, S2, and S3, or a combination thereof S3, and configured to obtain the aforementioned detections of temperature, light, sound, pressure, humidity, density, moisture, acceleration, voltage, current, material content level and pressure, motion, proximity, magnetism, rotation, orientation, velocity and/or deviation from original condition.

Taking motion detection as an example, it is desirable to increase the accuracy of a proximity determination undertaken by an EN 14 according to Equations (1)-(3) in the event that such a determination may become skewed by equally spaced RF transmissions of beacon advertisement messages from APs 16 and RPs 17. More specifically, obtaining such increased accuracy is beneficial in a case in which the skew is related to those RF transmissions passing through solid barriers, such as a dividing wall between adjacent structurally defined areas, i.e., adjacent rooms in a building, and when it is desired to know the proximity of the EN 14 with respect to one of those areas. Thus, a RP 17 or AP 16 may be configured to include an infrared sensor, such as a passive infrared (PIR) sensor, and to process and include in its transmitted beacon advertisement message an indication of one or more types of motion for which the PIR sensor is configured to detect. Such types of motion may include those that can be characterized based on categories for the comparative pace thereof, such as, for example, walking movement, non-walking or fast-paced movement, and idle activity, though other types of motion may be detected and indicated. An example of at least one of these other types of motion may include that which is characterized by a change in direction, for instance. Correspondingly, an EN 14 may be configured to detect its own type of comparatively paced motion, such as through inclusion of an accelerometer, though other types of motion may be detected according to the inclusion of an appropriate mechanism therefor. As such, the EN 14 may be configured to determine its most proximate RP 17 or AP 16 in accordance with Equations (1)-(3), based on a determination by the EN 14 of a matching motion state between that of the EN 14 and that of the RP 17 or AP 16. In other words, RSSs from an RP 17 or AP 16 whose detected motion state does not match the motion state of the EN 14 would not be considered in the evaluations implemented by the EN 14 when executing Equations (1)-(3). This way, the determination of a matching motion state provides a prerequisite for the proximity determination that is conducted by the EN 14, and thus ensures the accuracy thereof when RF skewing is presented.

Alternatively, and in order to prevent the RF skewing discussed above, an RP 17 or AP 16 may be equipped with an infrared or ultrasound transmitter to transmit an infrared signal in addition to its beacon advertisement message. Correspondingly, an EN 14 could be equipped with an infrared or ultrasound detector. In this way, and when considering use of infrared only (since ultrasound would function similarly), the RP 17 or AP 16 is configured for active infrared transmission, and the EN 14 is configured for active detection. In this instance, the signal transmitted by the RP 17 or AP 16 is encoded with the MAC address or other unique identifier for the RP 17 or the AP 16 for which the EN 14 is configured to detect. Thus, upon decoding and detection by the EN 14 of the infrared signal without errors (as verified by a checksum), the EN 14 shortcuts any proximity determination by the EN 14 such that the transmitting RP 17 or AP 16 would be identified (by its associated MAC address or other identifier) as being most proximate. In cases where an error is indicated, the EN 14 would revert to its proximity determination in accordance with Equations (1)-(3).

Additionally, each of the APs 16 and RPs 17 described herein may be configured to include directional and circularly polarized antennas to, respectively, better focus their broadcasts and reduce cross polarization loss sometimes experienced with vertically polarized antennas. This way, EN 14 proximity determinations may be achieved with increased accuracy.

In these ways, it will be understood that the embodiments disclosed herein optimize the efficiency of a BLE-enabled network by, at least, reducing power consumption of network resources. It will likewise be understood that the embodiments disclosed herein enable a determination of the relative location of an end node in view of its proximity to an access point or reference point, whether or not such access point is connectable or non-connectable.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A BLE end node (EN), comprising:
a locator configured to collect from each of
(a) a BLE reference point (RP) configured to transmit a beacon advertisement message to be detected by the locator,
identifying information included in the beacon advertisement message that indicates the BLE RP as the source of the beacon advertisement message when the beacon advertisement message is detected by the locator, and
(b) a first node defining a type thereof, or a plurality of first nodes in which each first node is defined by a same node type thereof, or
(c) a plurality of second nodes in which each second node is defined by a different node type as against the node type of another second node, or
(d) a combination of (b) and (c),
positional information not attributable to the BLE RP and transmitted from the single node or plurality of said nodes in accordance with the respective node type thereof, the positional information indicating a location of the BLE EN, whereby the locator is further configured to determine an indication of the location of the BLE EN differently when received from nodes of the same node type as against nodes of the different node type; and
a communicator operatively coupled with the locator to transmit an identity of the BLE EN, the identifying information of the BLE RP, and the positional information directly to a network server via a wireless backhaul, transmission of the identity of the BLE EN, the identifying information of the BLE RP, and the positional information enabling the network server to determine the location of the BLE EN, based upon one or more of the identifying information of the BLE RP and the positional information.

2. The BLE EN of claim 1, wherein:
the communicator comprises a transceiver operable with a low-power, wide-area network (LPWAN), or a transceiver operable with a cellular network.

3. The BLE EN of claim 2, wherein:
in response to the transceiver being operable with the cellular network, the positional information is defined by a cellular ID (CID) of a base station transceiver (BTS) with which the transceiver communicates.

4. The BLE EN of claim 3, wherein:
the locator comprises (a) a WiFi receiver, in which the positional information is further defined as a WiFi network detected by the WiFi receiver, or (b) a global positioning service (GPS) receiver, in which the positional information is further defined as GPS coordinates, or (c) a combination of (a) and (b).

5. The BLE EN of claim 4, wherein:
the BLE EN comprises a system on a chip (SoC).

6. The BLE EN of claim 4, wherein:
each of the locator and communicator are operable in accordance with instructions therefor configured for storage on and execution from a non-transitory computer readable medium.

7. The BLE EN of claim 6, wherein:
the computer readable medium is defined by a smart device.

8. The BLE EN of claim 1, wherein:
in response to a detection of a BLE AP configured to transmit a beacon advertisement message to the BLE EN, the BLE EN is configured to initiate a BLE connection to the BLE AP for the transfer of (a) the identity of the BLE EN, and (b) one or more of identifying information of the BLE AP and the identifying information of the BLE RP to the network server, if the BLE AP has attained a highest connection value, and
the locator is configured to estimate a nearest proximity of the BLE EN to each of the BLE AP and the BLE RP, whereby the connection value is based on an estimation conducted by the locator that a received signal strength (RSS) of the beacon advertisement message transmitted by the BLE AP renders the BLE AP as most proximate to the BLE EN.

9. The BLE EN of claim 8, wherein:
the estimation of nearest proximity is further based on a matching of a motion state of the BLE EN to a motion state that is detected by either the BLE AP or the BLE RP and included in each beacon advertisement message thereof.

10. A method of operating a BLE end node (EN), comprising:
determining a source of beacon advertisement message, and whether the beacon advertisement message has been received from a BLE source thereof, whereby
if the beacon advertisement message has been received,
estimating, at the BLE EN and via an estimator carried by the BLE EN, a proximity to the BLE source, and
determining whether the BLE source is at a nearest proximity from among a plurality of BLE sources transmitting beacon advertisement messages received by the BLE EN, and
in response to the BLE source being at the nearest proximity, transmitting an identity of the BLE EN and identifying information of the BLE source directly to a network server, the transmission of the identity of the BLE EN and the identifying information enabling the network server to determine a location of the BLE EN, based on the identifying information; and
if the beacon advertisement message has not been received, collecting at the BLE EN positional information indicating a location of the BLE EN and not attributable to the BLE source, and transmitting the identity of the BLE EN and the positional information directly from the BLE EN to the network server, via a wireless backhaul, the transmission of the identity of the BLE EN and the positional information enabling the network server to determine the location of the BLE EN, based upon the positional information.

11. The method of claim 10, further comprising:
detecting a BLE access point (AP) as the BLE source of the beacon advertisement message; and
in response to the BLE AP being detected, initiating a connection with the BLE AP and transferring the identity of the BLE EN and the identifying information to the network server, via the BLE AP, if the BLE AP has attained a highest connection value.

12. The method of claim 11, wherein:
the determination of the proximity of the BLE AP as the BLE source is based on a matching of a motion state of the BLE EN to a motion state that is detected by the BLE AP and included in the beacon advertisement message thereof.

13. The method of claim 12, wherein:
the connection value is given by the equation, $$\sigma = \alpha \cdot P + \beta \cdot L + \gamma, \text{ in which}$$

σ represents the connection value, as an absolute value, α represents a weighting factor of a confidence value that represents a level of expectation that the BLE AP is most proximate the BLE EN, P represents the confidence value, β represents the weighting factor assigned to loading of the network server to which the BLE AP is connected, L represents the loading value of the network server, and γ represents an association factor for the BLE AP.

14. The method of claim 10, wherein:
the determination of the BLE source defines the BLE source as a BLE reference point (RP), and the proximity of the BLE RP is based on a matching of a motion state of the BLE EN to a motion state that is detected by the BLE RP and included in the beacon advertisement message thereof.

15. The method of claim 14, wherein:
the identifying information is transmitted directly from the EN to the network server via a wireless backhaul.

16. The method of claim 15, wherein:
the wireless backhaul comprises a low-power, wide-area network (LPWAN) or a cellular network.

17. The method of claim 10, wherein:
the identifying information is transmitted directly from the BLE EN to the network server via a wireless backhaul.

18. The method of claim 17, wherein:
the wireless backhaul comprises a low-power, wide-area network (LPWAN) or a cellular network.

19. The method of claim 10, wherein:
the wireless backhaul comprises a low-power, wide-area network (LPWAN) or a cellular network.

20. The method of claim 10, wherein:
in response to the wireless backhaul comprising a cellular network, the positional information is defined by a cellular ID (CID) of a base station transceiver (BTS) with which the EN communicates.

21. The method of claim 20, wherein:
the positional information is further defined by (a) a WiFi network which the BLE EN detects, or (b) global positioning system (GPS) coordinates which the BLE EN determines, or (c) a combination of (a) and (b).

22. The method of claim 19, wherein:
in response to the wireless backhaul comprising the LPWAN, the positional information is defined by (a) a WiFi network which the BLE EN detects, or (b) global positioning system (GPS) coordinates which the BLE EN determines, or (c) a combination of (a) and (b).

23. The method of claim 10, in accordance with instructions therefor configured for storage on and execution from a non-transitory computer readable medium.

24. The method of claim 23, wherein:
the computer readable medium is defined by a smart device.

* * * * *